(12) United States Patent
Ikeda et al.

(10) Patent No.: US 9,481,093 B2
(45) Date of Patent: Nov. 1, 2016

(54) ELONGATED MEMBER CHUCKING APPARATUS AND ELONGATED MEMBER CHUCKING METHOD

(71) Applicant: MITSUBISHI HEAVY INDUSTRIES, LTD., Tokyo (JP)

(72) Inventors: Yusuke Ikeda, Tokyo (JP); Mikio Nakamura, Tokyo (JP); Takahiro Inagaki, Tokyo (JP); Yosuke Ikeda, Tokyo (JP); Yuji Kondo, Tokyo (JP); Toshiyuki Funato, Tokyo (JP); Takayuki Yoneda, Tokyo (JP); Hiromi Osaka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/373,932

(22) PCT Filed: Jan. 31, 2013

(86) PCT No.: PCT/JP2013/052149
§ 371 (c)(1),
(2) Date: Jul. 23, 2014

(87) PCT Pub. No.: WO2013/115299
PCT Pub. Date: Aug. 8, 2013

(65) Prior Publication Data
US 2014/0361565 A1     Dec. 11, 2014

(30) Foreign Application Priority Data
Feb. 3, 2012  (JP) ................ 2012-021770

(51) Int. Cl.
*B25J 15/06* (2006.01)
*B23P 19/00* (2006.01)
*B21J 15/32* (2006.01)

(52) U.S. Cl.
CPC ........... *B25J 15/0616* (2013.01); *B21J 15/32* (2013.01); *B23P 19/006* (2013.01)

(58) Field of Classification Search
CPC .................................................. B25J 15/0616
USPC ............. 294/183, 185, 186, 189, 65, 86.4; 81/429, 430; 414/752.1, 749.1, 737, 414/220.04, 220.09; 901/40; 29/743
See application file for complete search history.

(56) References Cited

U.S. PATENT DOCUMENTS 2,657,721 A * 11/1953 Shaff .............................. 81/430
3,583,451 A *  6/1971 Dixon et al. ................. 81/57.37
(Continued)

FOREIGN PATENT DOCUMENTS

CN      2494741       6/2002
DE      3200367       7/1982
(Continued)

OTHER PUBLICATIONS

International Preliminary Report on Patentability and Written Opinion of the International Searching Authority issued Aug. 5, 2014 in International (PCT) Application No. PCT/JP2013/052149.
(Continued)

*Primary Examiner* — Paul T Chin
(74) *Attorney, Agent, or Firm* — Wenderoth, Lind & Ponack, L.L.P.

(57) ABSTRACT

A case, in which an inner bottom surface is formed, and a chuck tool in which a lower surface is formed are provided. The inner bottom surface is a concave surface. The lower surface is a concave surface. An elongated member chucking apparatus changes an orientation of an elongated member inside the case to a predetermined orientation with respect to the chuck tool by sandwiching the elongated member between the inner bottom surface and the lower surface. The elongated member is held by the chuck tool in the predetermined orientation.

8 Claims, 8 Drawing Sheets

(56) References Cited

U.S. PATENT DOCUMENTS

| | | | |
|---|---|---|---|
| 4,002,265 A | | 1/1977 | Dixon |
| 4,462,283 A | | 7/1984 | Ito |
| 4,770,454 A | * | 9/1988 | Muscher et al. ............ 414/752.1 |
| 5,090,103 A | * | 2/1992 | Nakata et al. .................. 29/418 |
| 5,582,450 A | * | 12/1996 | Nagai et al. ................... 294/189 |
| 6,043,458 A | * | 3/2000 | Fortune ......................... 219/230 |
| 6,305,729 B1 | * | 10/2001 | Mukasa ......................... 294/185 |
| 8,800,409 B1 | * | 8/2014 | Wuester et al. .............. 81/57.37 |
| 2007/0051718 A1 | | 3/2007 | Schmitt |
| 2014/0223712 A1 | * | 8/2014 | Ikeda et al. .............. 29/243.521 |

FOREIGN PATENT DOCUMENTS

| | | |
|---|---|---|
| EP | 1495828 | 1/2005 |
| JP | 9-85665 | 3/1997 |
| JP | 2005-263481 | 9/2005 |
| JP | 2006-334687 | 12/2006 |
| JP | 2007-529326 | 10/2007 |
| JP | 2008-178940 | 8/2008 |
| JP | 2011-5594 | 1/2011 |
| WO | 2005/095045 | 10/2005 |

OTHER PUBLICATIONS

International Search Report issued May 7, 2013 in International (PCT) Application No. PCT/JP2013/052149.

Office Action issued May 6, 2015 in corresponding Chinese Application No. 201380007459.8 (with English translation of Search Report).

Decision on Patent Grant for Invention issued Jul. 27, 2015, in corresponding Russian Application No. 2014131008 (with partial translation).

Extended European Search Report issued Jan. 27, 2016 in corresponding European Application No. 13744101.0.

* cited by examiner

ELONGATED MEMBER CHUCKING APPARATUS AND ELONGATED MEMBER CHUCKING METHOD

The present application claims priority from Japanese Patent Application No. 2012-021770, filed on Feb. 3, 2012, the entirety of which is hereby incorporated by reference.

TECHNICAL FIELD

The present invention relates to an elongated member chucking apparatus and an elongated member chucking method, in particular, an elongated member chucking apparatus used for chucking an elongated member of a rod-like shape and an elongated member chucking method using the elongated member chucking apparatus.

BACKGROUND ART

A fastener used in assembly of an aircraft or the like is known. Such fastener is formed in generally a rod-like shape and sealing material (adhesive) is applied to a surface of the fastener. By applying such fastener to an object of multiple layers, the multiple layers are fastened together. A main wing portion of the aircraft made by being fastened by such fastener can prevent fuel leakage because of the sealing material. Such fastener is desired to be applied properly to the object to be fastened. Therefore, a fastener applying apparatus is desired to hold such fastener more properly.

A suction holding device which can securely hold a conveyed object having uneven surface such as a tile is disclosed in the patent literature 1 (Japanese Patent Application Publication JP2006-334687A). In the device, a contact member for holding the conveyed object is an air-permeable and is able to deform inelastically according to a shape of outer surface of the conveyed object and stick to the outer surface when it is in contact with the outer surface.

A suction-type transfer method is disclosed in the patent literature 2 (Japanese Patent Application Publication JP2005-263481A). With the method, it is possible to generate a negative pressure only at a required portion with which a conveyed object is contact. Therefore, a size of a negative pressure source can be reduced, and equipment costs and operating costs can be reduced. The method comprises sucking the conveyed object by utilizing a negative pressure, transferring the object to a predetermined place, and releasing the object by releasing the negative pressure. With the method, a plurality of suction sections, which have a plurality of suction cups at the end of the sections, respectively, are used. The method comprises contacting the conveyed object to some of the plurality of suction cups, sucking the object, transferring the object to the predetermined place, and releasing the negative pressure. With the method, the negative pressure is generated to only some suction cups of the plurality of suction cups, which are in contact with the object and are sticking to the object. On the other hand, the negative pressure is not generated to the other suction cups, which are not sticking to the object.

CITATION LIST

Patent Literature

Patent Literature 1: Japanese Patent Application Publication JP2006-334687A

Patent Literature 2: Japanese Patent Application Publication JP2005-263481A

SUMMARY OF THE INVENTION

An object of the present invention is to provide an elongated member chucking apparatus and an elongated member chucking method, with which an elongated member is held more properly by a chuck tool.

An optional object of the present invention is to provide the elongated member chucking apparatus and the elongated member chucking method, with which the elongated member is positioned in a predetermined location or orientation and the elongated member is held by the chuck tool.

An another optional object of the present invention is to provide the elongated member chucking apparatus and the elongated member chucking method, with which the elongated member is positioned in a predetermined location or orientation more securely and the elongated member is held by the chuck tool.

An another optional object of the present invention is to provide the elongated member chucking apparatus and the elongated member chucking method, with which a fastener is applied to an object to be fastened more properly.

The elongated member chucking apparatus according to the present invention includes: a case having an inner bottom surface; and a chuck tool having a lower surface. The inner bottom surface of the case is a concave surface. Any microscopic region on the inner bottom surface is lower as a distance between a central axis of the concave surface and the any microscopic region is smaller. The lower surface of the chuck tool is a concave surface. Any microscopic region on the lower surface is higher as a distance between a central axis of the concave surface (the lower surface) and the any microscopic region on the lower surface is smaller. The elongated member is held by the chuck tool when the elongated member inside the case is sandwiched between the inner bottom surface and the lower surface. With the elongated member chucking apparatus, the elongated member of different size can be inserted into the case. Moreover, when the elongated member is inside the case, the elongated member is forced to move to a predetermined position relative to the chuck tool by sandwiching the elongated member between the inner bottom surface and the lower surface. With such elongated member chucking apparatus, the elongated member is positioned in the predetermined location or orientation and the elongated member is held by the chuck tool more properly.

The elongated member chucking apparatus according to the present invention may further include a rotation mechanism for rotating the chuck tool when the elongated member is sandwiched between the inner bottom surface and the lower surface. With such elongated member chucking apparatus, the elongated member is forced to move to the predetermined position more securely by rotating the chuck tool when the elongated member is sandwiched between the inner bottom surface and the lower surface, and the elongated member is held by the chuck tool more properly.

The chuck tool of the elongated member chucking apparatus according to the present invention may further include a vacuum exhaust device connected to a hole formed in the lower surface of the chuck tool. With the vacuum exhaust device, the elongated member is held by the chuck tool by generating a negative pressure in a space between the lower surface of the chuck tool and the elongated member. With such elongated member chucking apparatus, the elongated member is held by the chuck tool more properly, irrespective of the material of the elongated member.

Adhesive may be applied to the elongated member. The case is made of a material with a smaller affinity value for the adhesive than a predetermined value. With such elongated member chucking apparatus, even if the adhesive has been stuck to the case, as compared to other cases made of a material with a larger affinity value than the predetermined value, the elongated member can be taken out from the case more easily and it is possible to prevent the adhesive from being separated from the elongated member.

The elongated member chucking apparatus according to the present invention may further include a transfer device configured to move the chuck tool for transferring the elongated member to an object to be fastened when the elongated member is held by the chuck tool. In other words, the elongated member chucking apparatus may be applied to an elongated member applying apparatus. With the elongated member applying apparatus provided with such elongated member chucking apparatus, the elongated member is applied to the object to be fastened more properly because the elongated member is held by the chuck tool properly.

The elongated member chucking apparatus according to the present invention may further include a tray having a plurality of cases including the above mentioned case. Any one case of the plurality of cases, which is not the above mentioned case, has an inner bottom surface same as the above mentioned case. The inner bottom surface of the any one case is a concave surface. Any microscopic region on the inner bottom surface of the any one case may be lower as a distance between a central axis of the concave surface and the any microscopic region is smaller. With such elongated member chucking apparatus, it is possible to convey a plurality of the elongated members at a time easily without sticking foreign material or contaminants to the plurality of elongated members because the plurality of elongated members are stored in the plurality of cases, respectively.

The elongated member chucking method according to the present invention is performed using an elongated member chucking apparatus. The elongated member chucking apparatus includes: a case having an inner bottom surface; and a chuck tool having a lower surface. The inner bottom surface of the case is a concave surface. Any microscopic region on the inner bottom surface is lower as a distance between a central axis of the concave surface and the any microscopic region is smaller. The lower surface of the chuck tool is a concave surface. Any microscopic region on the lower surface is higher as a distance between a central axis of the concave surface (the lower surface) and the any microscopic region on the lower surface is smaller. The elongated member chucking method according to the present invention includes: a step of moving the chuck tool and sandwiching an elongated member inside the case between the inner bottom surface and the lower surface; and a step of holding the elongated member by the chuck tool when the elongated member is sandwiched between the inner bottom surface and the lower surface. With such elongated member chucking method, the elongated member moves to a predetermined position relative to the chuck tool by sandwiching the elongated member between the inner bottom surface and the lower surface. Therefore, with such elongated member chucking method using the elongated member chucking apparatus, the elongated member is positioned in the predetermined location or orientation and the elongated member is held by the chuck tool more properly.

The elongated member chucking method according to the present invention may further include a step of rotating the chuck tool when the elongated member is sandwiched between the inner bottom surface and the lower surface. The elongated member is held by the chuck tool after rotating the chuck tool. With such elongated member chucking method using the elongated member chucking apparatus, the elongated member is forced to move to the predetermined position more securely by rotating the chuck tool when the elongated member is sandwiched between the inner bottom surface and the lower surface, and the elongated member is held by the chuck tool more properly.

The elongated member chucking method according to the present invention may further include a step of moving the chuck tool for transferring the elongated member to an object to be fastened when the elongated member is held by the chuck tool. In other words, the elongated member chucking method may be applied to an elongated member applying method for applying the elongated member to the object to be fastened. With such elongated member applying method, the elongated member is applied to the object to be fastened more properly because the elongated member is held by the chuck tool properly.

With the elongated member applying apparatus and the elongated member applying method, the elongated member is positioned in the predetermined location or orientation and the elongated member is held by the chuck tool more properly.

BRIEF DESCRIPTION OF THE DRAWINGS

The above objects, other objects, effects, and characteristics of the present invention will become clearer by the description of embodiments with the drawings, in which.

DESCRIPTION OF EMBODIMENTS

Figure 1:
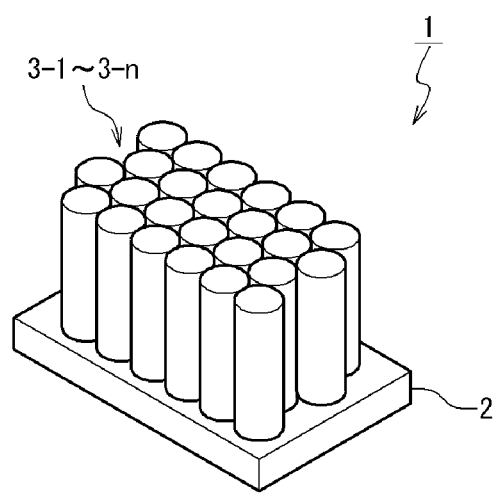
FIG. 1 is a perspective view showing a fastener storage container.

With reference to the drawings, embodiments of the present invention will be explained below. Such elongated member chucking apparatus is applied to an elongated member applying apparatus for inserting a fastener in an object to be fastened. The elongated member chucking apparatus includes a storage holder for storing the fastener, an elongated member applying apparatus body, and a control device. As shown in FIG. 1, the storage holder 1 includes a tray 2 and a plurality of cases 3-1, . . . , 3-n and (n=2, 3, 4, . . . ). The tray 2 is made of a plastic. The tray 2 is formed in a plate shape. The plurality of cases 3-1, . . . , 3-n are made of the same plastic as the tray 2 is made of. The plurality of cases 3-1, . . . , 3-n are formed in a generally cylindrical shape and have substantially the same shape with each other. The plurality of cases 3-1, . . . , 3-$n$ are arranged so that longitudinal direction of the cylinders is parallel to each other and the cases are in contact with each other, and are fixed to the tray 2.

Figure 2:
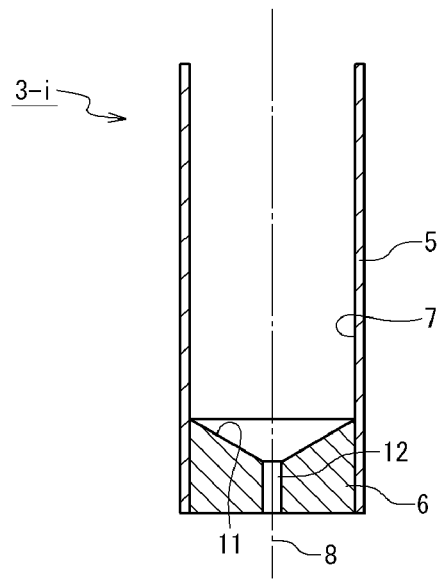
FIG. 2 is a sectional view showing the case.

FIG. 2 shows any case 3-$i$ (i=1, 2, 3, . . . , n) of the plurality of cases 3-1, . . . , 3-$n$. The case 3-$i$ includes a side portion 5 and a bottom lid portion 6. The side portion 5 is formed in a cylindrical shape. One end of the cylinder which is the side portion 5 is open. The other end, which is opposite to the open end, of the side portion 5 and the bottom lid portion 6 are connected to the tray 2. Thus, the case 3-$i$ is fixed to the tray 2. The inner side surface 7 of the side portion 5 is formed along a side surface of an imaginary cylinder having a predetermined diameter. In other words, the inner side surface 7 of the side portion 5 is formed so that a distance between any microscopic region on the inner side surface 7 and the central axis 8 of the cylinder is constant. The bottom lid portion 6 is disposed at an end portion of the side portion 5, which is connected to the tray 2, and closes its end. The bottom lid portion 6 includes an inner bottom surface 11 and a hole 12. The inner bottom surface 11 may be formed in a so-called mortar shape. In other words, the inner bottom surface 11 is formed in a concave shape and is formed along a side surface of an imaginary cone. Moreover, the inner bottom surface 11 is formed so that the nearer a distance between a point on the surface 11 and the central axis 8 is, the further a distance between the point on the surface 11 and the open end of the side portion 5 is. The hole 12 is formed in the inner bottom surface 11 and is located at the cross point with the central axis 8. The hole 12 is formed so that the inside of the case 3-$i$ and the outside of the case 3-$i$ is communicating with each other.

The tray 2 and the plurality of cases 3-1, . . . , 3-$n$ are made of the same raw material. Therefore, the fastener storage holder 1 can be produced by injection molding. The fastener storage holder 1, which is made by injection molding, can be produced more easily compared to another fastener storage holder, which is made by assembling a tray and a plurality of cases produced separately.

Figure 3:
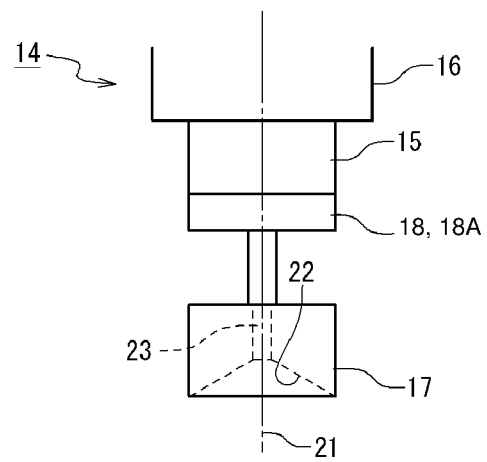
FIG. 3 is a side view showing an elongated member applying apparatus body.

FIG. 3 shows the elongated member applying apparatus body 14. The elongated member applying apparatus body 14 includes a base 15, a transfer device 16, a chuck tool 17, and a rotating mechanism 18. The transfer device 16 supports the base 15 to be movable relative to the base structure (not shown). Further, the transfer device 16 moves the base 15 to predetermined location according to an instruction from the control device. The chuck tool is formed in a generally cylindrical shape. The diameter of the cylinder (the chuck tool 17) is slightly smaller than the inner diameter of the side portion 5 of the case 3-$i$. The chuck tool 17 is supported by the base 15 to be rotationally movable about an axis of rotation 21. The rotation axis 21 is fixed to the base 15. The chuck tool 17 includes a lower surface 22, a hole 23, and a vacuum exhaust device (not shown). The lower surface 22 is disposed on the side opposite to the side facing the rotating mechanism 18. The lower surface 22 is formed in a so-called mortar shape. The lower surface 22 is formed in a concave shape, and is formed along a side surface of an imaginary cone. The lower surface 22 is formed so that the rotation axis 21 passes through the apex of the cone. In other words, the lower surface 22 is formed so that the nearer a distance between a point on the surface 22 and the rotation axis 21 is, the nearer a distance between the point on the surface 22 and the base 15 is. The hole 23 is formed in the lower surface 22 and is located at the cross point with the rotation axis 21. The hole is communicated with the vacuum exhaust device through a pipe (not shown). The vacuum exhaust device draws air from a vicinity of the lower surface 22 through the hole 23 according to an instruction from the control device, and generates a negative pressure in the vicinity of the lower surface 22. The rotating mechanism 18 rotates the chuck tool 17 about the rotation axis 21 according to an instruction from the control device.

Figure 4:
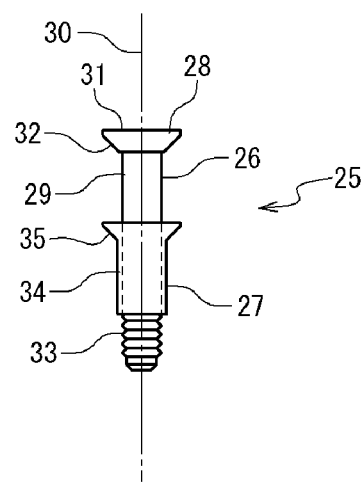
FIG. 4 is a side view showing the fastener.

FIG. 4 shows the fastener of one type of a plurality of fasteners types, which can be stored in the fastener storage holder 1. The fastener 25 includes a counter-sunk bolt 26 and a sleeve 27. The counter-sunk bolt 26 is made of titanium metal. The counter-sunk bolt 26 comprises a head portion 28 and a cylindrical portion 29. The cylindrical portion 29 is formed substantially in a cylinder whose shape is obtained by rotating an imaginary rectangle about an axis 30. The cylindrical portion 29 includes a male screw 33 at one end. The head portion 28 is formed in a disk (For example, truncated cone) whose shape is obtained by rotating an imaginary predetermined plane figure about the axis 30. The diameter of the disc is greater than the diameter of the cylindrical portion 29. The head portion 28 is formed at the opposite end of the end of the cylindrical section 29 where the male screw 33 is formed. The head portion 28 includes a head upper surface 31 and a head side surface 32. The head upper surface 31 is formed on the opposite side of the cylindrical portion 29. The head upper surface 31 is formed flat. The head side surface 32 is formed along an imaginary side surface of a truncated cone, and the apex of the imaginary truncated cone is located inside the cylindrical portion 29.

The sleeve 27 is made of a material (for example a plastic) different from the fastener storage holder 1. The sleeve 27 includes a cylindrical portion 34 and a plate portion 35. The cylindrical portion 34 is formed in a cylindrical shape. The plate portion 35 is formed in a shape extending along the side of an imaginary cone from one end of the cylindrical portion 34. The sleeve 27 is disposed so that the cylindrical portion 34 surrounds a part of the cylindrical portion 29 of the counter-sunk bolt 26 and the plate portion 35 is closer to the head portion 28 than the cylindrical portion 34. Further, the sleeve 27 is disposed so that a part of cylindrical portion where the male screw 33 is formed is exposed from the sleeve 27. Moreover, the sleeve 27 is disposed so that a part of cylindrical portion 29 where a distance from the head portion 28 is smaller than a predetermined length is exposed from the sleeve 27.

Further, regarding to the fastener 25, sealing material (adhesive) is applied to an outer surface of the sleeve 27 and the head side surface 32. Note that the fastener storage holder 1 is made of the material with the affinity is relatively small for the sealing material. In other words, the affinity between the material (a plastic) of the fastener storage holder 1 and the sealing material is sufficiently smaller than the affinity between the material of the sleeve 27 and the sealing material and is smaller than the affinity between the material of the counter-sunk bolt 26 and the sealing material.

The fasteners of the plurality of types, respectively, are formed in the same manner as the fastener 25, but the size is different with each other.

Note that, the diameter of the inner side surface 7 of the case 3-$i$ is designed so that an angle between an axis 30 of an fastener of any type out of the plurality of types and the central axis 8 is smaller than a predetermined angle when the fastener is disposed inside the case 3-$i$ and is placed against the inner side surface 7. Further, the diameter of the hole 12 of the case 3-$i$ is designed so that the cylindrical portion 29 of the fastener of any type is not able to enter the hole 12.

Moreover, the diameter of the hole 23 of the chuck tool 17 of the elongated member applying apparatus body 14 is designed so that the head portion 28 of the fastener of any type is not able to enter the hole 23.

Figure 5:
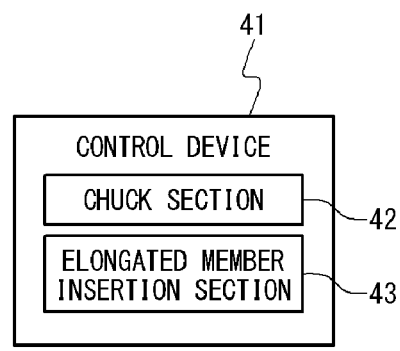
FIG. 5 is a block diagram of a control device.

FIG. 5 shows the control device. The control device 41 is a computer, and includes a CPU (not shown), a storage device (not shown), and an interface (not shown). The CPU controls the storage device and the interface by executing a computer program installed into the computer from a non-transitory computer-readable recording medium. The storage device records the computer program and, temporarily records information created by the CPU.

The interface outputs information generated by an external device, which is connected to the control device 41 so that the information can be transmitted, to the CPU. The interface outputs information generated by the CPU to the external device. The external device is, for example, an input device, output device, a communication device, a removable memory drive, etc. The input device creates information by being operated by a user, and outputs the information to the CPU. The input device is, for example, a keyboard, a pointing device, a touch panel, etc. The output device outputs information generated by the CPU recognizably to the user. The output device is, for example, a display, an audio device, a touch panel, etc. The communication device transfers information generated by the CPU to another computer via a communication network, and transfers information received from the other computer via the communication network to the CPU. Further, the communication device is used for downloading a computer program to be installed on the computer from another computer. The removable memory drive is used for reading data recorded on a recording medium when the recording medium is inserted therein. Further, the removable memory drive is used for installing a computer program on the computer when a recording medium having the computer program recorded thereon is inserted. The recording medium is, for example, a magnetic disc (a flexible disk, a hard disk), an optical disk (CD, DVD), a magneto-optical disk, flash memory, etc. Further, the control device 41 is connected to the transfer device 16, the vacuum exhaust device of the chuck tool 17, and the rotating mechanism 18 via the interface so that the information can be transmitted.

The control device 41 realizes a plurality of functions, respectively, by the computer program installed in the control device 41. A function of a chuck section 42 and a function of an elongated member insertion section 43 are included in the plurality of functions.

The chuck section 42 controls the transfer device 16 so that the central axis 8 coincides with the rotation axis 21 and the fastener 25 is sandwiched between the lower surface 22 of the chuck tool 17 and the upper bottom surface 11 of the case 3-$i$ with a predetermined force when the fastener is disposed in the case 3-$i$ of the plurality of cases 3-1, ..., 3-$n$. The chuck section 42 controls the rotating mechanism 18 so that the chuck tool 17 rotates about the rotation axis 21 when the central axis 8 of the case 3-$i$ coincides with the rotation axis 21 and the fastener 25 is sandwiched between the upper bottom surface 11 and the lower surface 22 with the predetermined force. The chuck section 42 controls the vacuum exhaust device of the chuck tool 17 so that the fastener 25 is held by the chuck tool 17 by generating the negative pressure between the fastener 25 and the lower surface 22 of the chuck tool 17 when the axis 30 of the fastener 25 coincides with the rotation axis 21.

The elongated member insertion section 43 controls the transfer device 16 so that the axis 30 of the fastener 25 coincides with an axis of the hole formed in the object to be fastened when the fastener 25 is held by the chuck tool 17. The elongated member insertion section 43 controls the transfer device 16 so that the fastener 25 is inserted in the hole when the axis 30 of the fastener 25 coincides with the axis of the hole formed in the object to be fastened. Further, the elongated member insertion section 43 controls the vacuum exhaust device of the chuck tool 17 so that the fastener 25 is released from the chuck tool 17 after the fastener 25 has been inserted in the hole formed in the object to be fastened.

Figure 6:
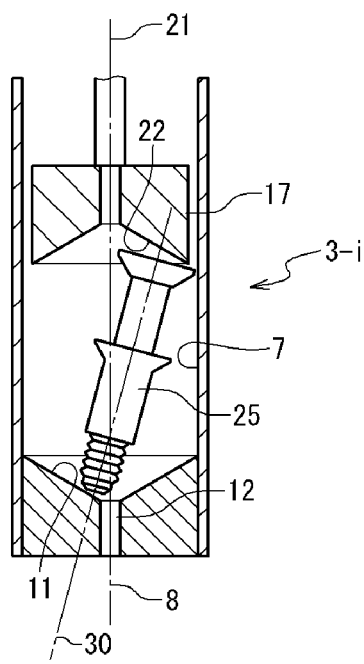
FIG. 6 is a sectional view showing the fastener disposed within the case.

One embodiment of the elongated member chucking method according to the present invention is applied to the elongated member applying method for inserting the fastener in the object to be fastened, and this embodiment is executed by the elongated member chucking apparatus. Firstly, the user produces the plurality of fasteners, and places the plurality of fasteners in the plurality of cases 3-1, ..., 3-$n$ of the fastener storage holder 1, respectively. The fastener 25 is disposed in the case 3-$i$ so that the axis 30 of the fastener 25 is not aligned with the central axis 8 of the case 3-$i$ and the fastener 25 is placed against the inner side surface 7 as shown in FIG. 6 when the fastener 25 is inserted in the case 3-$i$ of the plurality of cases 3-1, ..., 3-$n$.

There is a case in which the sealing material applied to the fastener 25 sticks to the inner side surface 7 of the case 3-$i$ when the fastener 25 is placed against the inner side surface 7. It is possible to prevent the sealing material from separating from the fastener 25 when the fastener 25 is separated from the inner side surface 7 because the fastener storage holder 1 is made of the plastic whose affinity is relatively small for the sealing material.

After placing the plurality of fasteners in the plurality of cases 3-1, ..., 3-$n$, respectively, the user covers the plurality of cases 3-1, ..., 3-$n$ with a cover. The cover can prevent foreign material from entering into the plurality of cases 3-1, ..., 3-$n$ before the plurality of fasteners are used and therefore prevent the decline of adhesion force of the sealing material resulted from the adhesion of the foreign material to the sealing material of the fastener 25.

Next, the user fixes the object to be fastened to the base structure. Then, after the elongated member applying apparatus body 14 and the object to be fastened are disposed to predetermined positions, respectively, the user removes the cover from the fastener storage holder 1 and places the fastener storage holder 1 at a predetermined position with respect to the elongated member applying apparatus body 14.

After the fastener storage holder 1, the elongated member applying apparatus body 14, and the object to be fastened are disposed to the predetermined positions, respectively, the control device 41 controls the transfer device 16 to move the chuck tool 17 so that the central axis 8 of the case 3-$i$ of the plurality of cases 3-1, ..., 3-$n$ in which the fastener 25 is placed coincides with the rotation axis 21 as shown in FIG. 6 and the fastener 25 is sandwiched between the lower surface 22 of the chuck tool 17 and the upper bottom surface 11 of the case 3-$i$ with the predetermined force. When the central axis 8 of the case 3-$i$ coincides with the rotation axis 21 and the fastener 25 is sandwiched between the upper bottom surface 11 and the lower surface 22 with the predetermined force, the control device 41 controls the rotating mechanism 18 to rotate the chuck tool 17 about the rotation axis 21 a predetermined amount.

Figure 7:
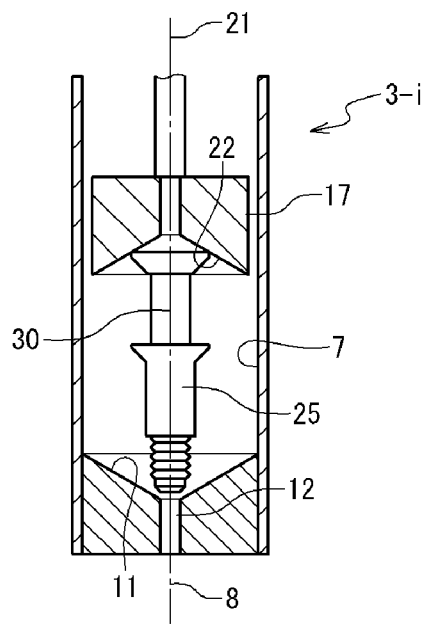
FIG. 7 is a sectional view showing the fastener after the chuck tool is rotated.

Even if the fastener 25 is disposed in the case 3-$i$ in the condition that the axis 30 of the fastener 25 is not aligned to the central axis 8 of the case 3-$i$, the fastener 25 moves so that the axis 30 coincides with the central axis 8 of the case 3-*i*, namely, the axis 30 coincides with the rotation axis 21 as shown in FIG. 7 by rotating the chuck tool 17 sufficiently.

Figure 8:
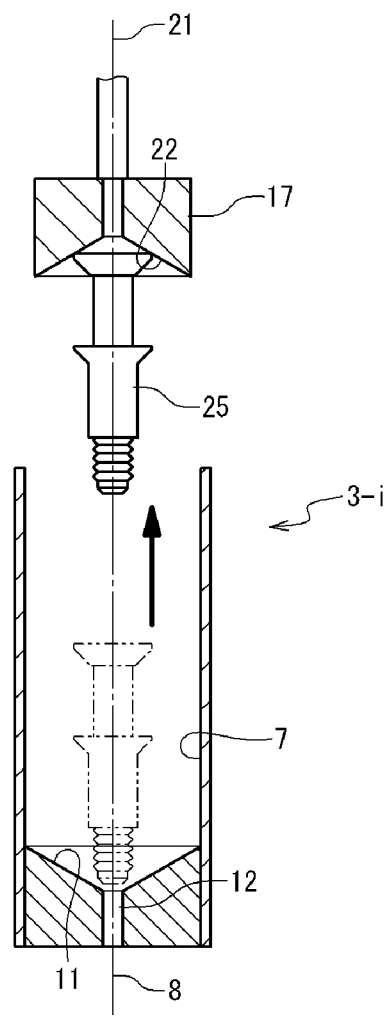
FIG. 8 is a sectional view showing the fastener held by the chuck tool.

When the axis 30 of the fastener 25 coincides with the rotation axis 21 and after the rotation of the chuck tool 17 is stopped, the control device 41 controls the vacuum exhaust device to generate the negative pressure in the space between the fastener 25 and the lower surface 22 of the chuck tool 17. Note that, a pressure inside the case 3-*i* is always the same as a pressure outside the case 3-*i*, because air can flow into the case 3-*i* through the hole 12 which is communicated with the outside of the case 3-*i*. Therefore, the fastener 25 is held by the chuck tool 17 with the state that the axis 30 of the fastener 25 coincides with the rotation axis 21 by the pressure difference between the space, which is formed between the fastener 25 and the lower surface 22 of the chuck tool 17, and the inside of the case 3-*i*. When the fastener 25 is held by the chuck tool 17, the control device 41 controls the transfer device 16 to move out the chuck tool 17 from the case 3-*i* and take out the fastener 25 from the case 3-*i* as shown in FIG. 8.

Figure 9:
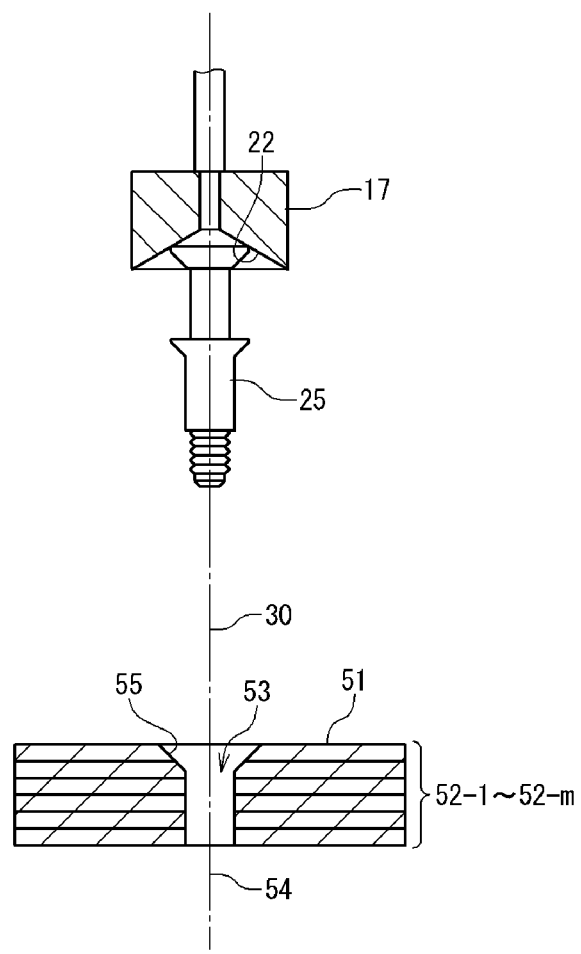
FIG. 9 is a sectional view showing the fastener that is conveyed to the hole formed in the object to be fastened.

As shown in FIG. 9, the object 51 to be fastened includes a plurality of plate-shaped members 52-1, . . . , 52-*m* (m=2, 3, 4, . . . ). A part of a finished product is formed by fixing the plurality of plate-shaped members 52-1, . . . , 52-*m* to a predetermined position with each other. The hole 53 is formed in the object 51 to be fastened. The hole 53 is formed in a cylindrical shape whose side surface is along a side surface of an imaginary cylinder which is obtained by rotating an imaginary rectangle about an axis 54. The hole 53 extends through the object 51 to be fastened. The hole 53 is formed by aligning a plurality of holes formed in the plurality of plate-shaped members 52-1, . . . , 52-*m*, respectively. Further, a countersink wall surface 55 is formed in the object 51 to be fastened. The countersink wall surface 55 is formed in a shape of a side surface of a cone so as to be in close contact with the plate portion 35 of the fastener 25 when the fastener 25 is inserted into the hole 53. A plurality of holes are formed in the object 51 to be fastened in the same manner as the hole 53 is formed.

Figure 10:
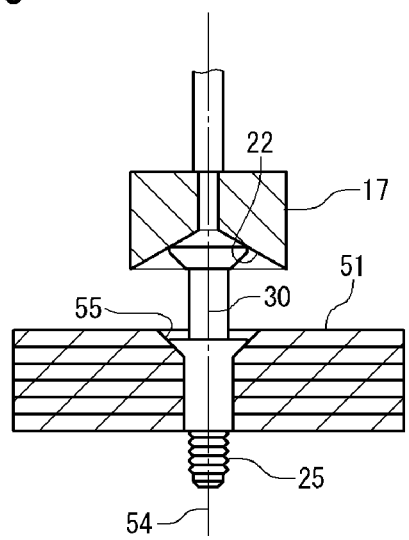
FIG. 10 is a sectional view showing the fastener inserted into the hole formed in the object to be fastened.
Figure 11:
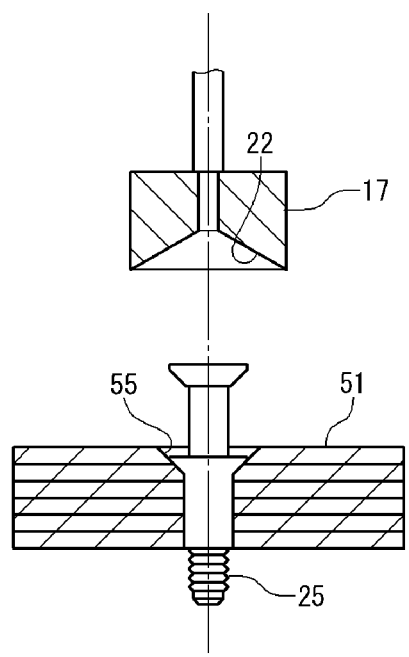
FIG. 11 is a sectional view showing the fastener that has been released from the chuck tool.

After the fastener 25 is taken out from the case 3-*i*, the control device 41 controls the transfer device 16 to move the fastener 25 so that the axis 30 of the fastener 25 coincides with the axis 54 of the hole 53 formed in the object 51 to be fastened as shown FIG. 9. After the axis 30 of the fastener 25 coincides with the axis 54 of the hole 53 formed in the object 51 to be fastened, the control device 41 controls the transfer device 16 to move the fastener 25 in a direction parallel to the axis 30 and insert the fastener 25 into the hole 53 formed in the object 51 to be fastened so that the plate portion 35 of the fastener 25 is close contact with the countersink wall surface 55 as shown FIG. 10.

After the fastener 25 is inserted into the hole 53 so that the plate portion 35 of the fastener 25 is close contact with the countersink wall surface 55, the control device 41 controls the vacuum exhaust device to release the fastener 25 from the chuck tool 17. After the fastener 25 is released from the chuck tool 17, the control device 41 controls the transfer device 16 to separate the chuck tool 17 from the fastener 25.

The control device 41 repeatedly executes an operation from chucking the fastener to inserting the fastener to the hole formed in the object 51 to be fastened until the plurality of fasteners are inserted into the plurality of holes formed in the object to be fastened, respectively.

By repeatedly applying the impact force to the head upper surface 31 of the counter-sunk bolt 26 of the fastener 25, the user inserts the fastener 25 into the hole 53 until the head side surface 32 of the counter-sunk bolt 26 of the fastener 25 hits the countersink wall surface 55 via the plate portion 35 of the sleeve 27. Further, by attaching a nut (not shown) to the male screw 33 of the counter-sunk bolt 26 of the fastener 25 which extends from the bottom surface of the object 51 to be fastened, the user fastens the plurality of plate-shaped members 52-1, . . . , 52-*m* of the object 51 to be fastened.

According to the elongated member chucking method mentioned above, it is possible to prevent from the foreign material from sticking to the sealing material and it is possible to prevent the sealing material from being peeled because the fastener is stored inside the case 3-*i* from the time of producing the fastener 25 to the time of being held by the chuck tool 17.

A shelf plate for holding a plurality of fasteners is known. The shelf holds the portion of the cylindrical portion 29, which extends from the sleeve 27. In general, such a shelf is made of a metal, which is an elastic body, and holds the plurality of fasteners with the elastic force. The fastener storage holder 1 can be made of the plastic, and be made lighter in weight than the shelf plate. Further, when the shelf plate is produced to hold some size of fastener, there is a case that the shelf plate is not able to hold another type of fastener with a different size. Therefore, it is necessary to prepare a plurality of types of shelf plates corresponding to a plurality of types of fasteners when an elongated member applying apparatus with such shelf plates is used with the plurality of types of fasteners of various sizes. With the elongated member chucking apparatus, it is possible to store the plurality of types of fasteners of various sizes by using one kind of the fastener storage holder 1. Therefore, the elongated member chucking apparatus can be produced more easily than another elongated member chucking apparatus with such shelf plates. Regarding to the plurality of types of fasteners, a quotient obtained by dividing the maximum length of the fastener of the plurality of types by the minimum length of the fastener of the plurality of types is approximately 4, and a quotient obtained by dividing the maximum diameter of the fastener of the plurality of types by the minimum diameter of the fastener of the plurality of types is approximately 2. The length of the fastener 25 is defined as the length between two planes perpendicular to the axis 30 when the fastener is sandwiched between the two planes. The diameter of the fastener is defined as the width between two planes parallel to the axis 30 when the head portion 28 is sandwiched between the two planes.

According to the elongated member chucking method mentioned above, with the elongated member chucking apparatus, it is possible to hold the fastener 25 by the chuck tool 17 more easily so that the axis 30 of the fastener 25 coincides with the rotation axis 21. As a result, according to such elongated member chucking method, with the elongated member chucking apparatus, it is possible to insert the fastener 25 into the hole 53 formed in the object 51 to be fastened more properly and it is possible to fasten the plurality of plate-shaped members 52-1, . . . , 52-*m* of the object 51 to be fastened more properly.

Note that the fastener storage holder 1 can be replaced with another fastener storage holder which is produced by assembling a tray and a plurality of cases, which are produced separately. Also, the fastener storage holder 1 can be replaced with another fastener storage holder which is made of a material whose affinity is relatively high for the sealing material applied to the fastener 25. With regard to the fastener storage holder which is made of the high affinity material for the sealing material, the surface of the fastener storage holder to which the sealing material of the fastener 25 is possible to stick (for example the inner side surface 7 and the upper bottom surface 11) is coated with low affinity material for the sealing material. With regard to the elongated member chucking apparatus with such fastener storage holder, it is possible to hold the fastener 25 by the chuck tool 17 properly in the same manner as the elongated member chucking apparatus of above-mentioned embodiment. Further, the fastener storage holder 1 can be replaced with another fastener storage holder which is made of a material selected irrespective of the characteristic of the sealing material. Such fastener storage holder can be used in a case that the separation of the sealing material of the fastener 25 is not seemed to be a big problem or in a case that the fastener without the sealing material is used. In the case mentioned above, with such fastener storage holder, it is possible to hold the fastener 25 by the chuck tool 17 properly in the same manner as the elongated member chucking apparatus of above-mentioned embodiment.

Note that the inner side surface 7 of the case 3-$i$ can be replaced with another side surface formed in another shape different from the shape of the side surface of the cylinder. The shape is, for example, a prism with a regular polygon bottom surface. With such elongated member chucking apparatus with the case having such inner side surface, it is possible to hold the fastener 25 by the chuck tool 17 properly in the same manner as the elongated member chucking apparatus of above-mentioned embodiment.

Note that the upper bottom surface 11 of the case 3-$i$ can be replaced with another upper bottom surface formed in another concave surface different from the side surface of the cone. The upper bottom surface 11 is formed so that the depth of any point on the intersection line of any plane including the central axis 8 and the upper bottom surface 11 monotonically decreases as the distance from the any point to the central axis 8 increases. The concave surface is, for example, a side surface of a pyramid, a non-developable surface. The non-developable surface is one in which an intersection line of a plane including the central axis 8 and the upper bottom surface 11 is formed a curve different from a straight line between the inner side surface 7 and the central axis 8. The non-developable surface is one in which the intersection line is, for example, an upward convex line (for example a part of spherical surface), a downward convex line, etc. With the elongated member chucking apparatus having such upper bottom surface in the case, it is possible to hold the fastener 25 by the chuck tool 17 properly in the same manner as the elongated member chucking apparatus of above-mentioned embodiment.

Note that the lower surface 22 of the chuck tool 17 can be formed in another concave surface different from the side surface of the cone same as the upper bottom surface 11 of the case 3-$i$. The lower surface is formed so that the depth of any point on the intersection line of any plane including the rotation axis 21 and the lower surface monotonically decreases as the distance from the any point to the central axis 21 increases. With the elongated member chucking apparatus having such lower surface, it is possible to hold the fastener 25 by the chuck tool 17 properly in the same manner as the elongated member chucking apparatus of above-mentioned embodiment.

Note that the rotating mechanism 18 may be replaced by another rotating mechanism which converts the movement of narrowing a distance between the base 15 and the chuck tool 17 to the rotation of the chuck tool 17. Such rotating mechanism is well-known, and such rotating mechanism is applied to, for example, an automatic driver. With the elongated member chucking apparatus having such rotating mechanism, it is possible to hold the fastener 25 by the chuck tool 17 properly in the same manner as the elongated member chucking apparatus of above-mentioned embodiment.

Note that the rotating mechanism 18 may be replaced by a vibration device 18$a$ which applies a vibration to the chuck tool 17. The control device 41 controls the vibration device to vibrate the chuck tool 17 when the central axis 8 of the case 3-$i$ coincides with the rotation axis 21 and the fastener 25 is sandwiched between the upper bottom surface 11 and the lower surface 22 with a predetermined force. As the chuck tool 17 is vibrated sufficiently, the fastener 25 moves so that the axis 30 coincides with the central axis 8 of the case 3-$i$ as shown in FIG. 7, in other words, the axis 30 coincides with the rotation axis 21. Therefore, with the elongated member chucking apparatus having such vibration device, it is possible to hold the fastener 25 by the chuck tool 17 properly in the same manner as the elongated member chucking apparatus of above-mentioned embodiment.

Note that the rotating mechanism 18 may be omitted, when the upper bottom surface 11 of the case 3-$i$ and the lower bottom surface 22 are formed steep sufficiently. In this case, as the fastener 25 is sandwiched by a predetermined force, the fastener 25 moves so that the axis 30 coincides with the central axis 8 of the case 3-$i$ as shown in FIG. 7, in other words, the axis 30 coincides with the rotation axis 21. Therefore, with the elongated member chucking apparatus without the rotating mechanism 18, it is possible to hold the fastener 25 by the chuck tool 17 properly in the same manner as the elongated member chucking apparatus of above-mentioned embodiment.

Note that at least one of the transfer device 16, rotating mechanism 18 or the control device 41 may be omitted. In this case, the user manually operates the chuck tool 17 so that the chuck tool 17 moves to a predetermined location, the chuck tool 17 rotates, or the chuck tool 17 holds the fastener 25. With the elongated member chucking apparatus without at least one of the transfer device 16, rotating mechanism 18 or the control device 41, it is possible to hold the fastener 25 by the chuck tool 17 properly in the same manner as the elongated member chucking apparatus of above-mentioned embodiment.

Note that the hole 23 may be replaced with another hole which is formed at a different location from the location in the upper bottom surface 11. The different location is, for example, a location in a region of the inner side surface 7 where the fastener does not contact with. With the elongated member chucking apparatus having such hole in the case 3-$i$, it is possible to hold the fastener 25 by the chuck tool 17 properly in the same manner as the elongated member chucking apparatus of above-mentioned embodiment.

Note that the chuck tool 17 may be replaced by another chuck device which holds the fastener 25 in a manner different from the vacuum chuck. The means for chucking is, for example, a mechanical chuck, a magnetic chuck, etc. With the elongated member chucking apparatus having the mechanical chuck, it is possible to hold the fastener 25 by the chuck tool properly in the same manner as the elongated member chucking apparatus of above-mentioned embodiment. The elongated member chucking apparatus having the mechanical chuck, the number of parts is relatively large and the size is relatively large. Therefore, the elongated member chucking apparatus having the chuck tool 17 mentioned above can be produced more easily compared to the elongated member chucking apparatus having such mechanical chuck. The elongated member chucking apparatus having the magnetic chuck can be applied when the fastener 25 is made of magnetic material, and hold the fastener 25 by the chuck tool properly in the same manner as the elongated member chucking apparatus of above-mentioned embodiment. However, the elongated member chucking apparatus having the magnetic chuck cannot hold the fastener 25 when the fastener 25 is not made of magnetic material. The elongated member chucking apparatus having the vacuum chuck or the mechanical chuck can hold the fastener made of more various materials compared to the elongated member chucking apparatus having the magnetic chuck.

The elongated member chucking apparatus can also be applied to another apparatus which holds another elongated member different from the fastener 25. Such another apparatus and such elongated member are, for example, a machine tool and a drill, respectively. With such another apparatus, it is possible to hold such another elongated member by the chuck tool properly in the same manner as the elongated member chucking apparatus of above-mentioned embodiment.

The invention claimed is:

1. An elongated member chucking apparatus comprising:
   a case having a bottom lid portion, a side portion and an open end which is arranged opposite to the bottom lid portion, the bottom lid portion including an inner bottom surface;
   a chuck tool having a lower surface; and
   a rotating mechanism,
   wherein said inner bottom surface of the case is formed in a concave shape or a substantial V-shape, and any point on said inner bottom surface is lower as a distance from a central axis of the inner bottom surface is smaller,
   wherein said lower surface of the chuck tool is formed in a concave shape or a substantially inverted V-shape, and any point on said lower surface is higher as a distance from a central axis of the lower surface is smaller,
   wherein the chuck tool is configured to hold an elongated member in a predetermined orientation in a state in which said elongated member inside the case is sandwiched between said inner bottom surface and said lower surface,
   wherein the rotating mechanism is configured to rotate said lower surface of the chuck tool in the state in which said elongated member inside the case is sandwiched between said inner bottom surface and said lower surface, and
   wherein the chuck tool is configured to take out said elongated member through the open end.

2. The elongated member chucking apparatus according to claim 1, wherein said chuck tool comprises a vacuum exhaust device connected to a hole formed in said lower surface of the chuck tool,
   wherein said vacuum exhaust device is configured to generate a negative pressure in a space between said lower surface of the chuck tool and said elongated member, and
   wherein the chuck tool is configured to hold said elongated member in said predetermined orientation by said negative pressure.

3. The elongated member chucking apparatus according to claim 1, wherein said elongated member is provided with an adhesive thereon, and
   wherein said case is made of a material with a smaller affinity value for said adhesive than a predetermined value.

4. The elongated member chucking apparatus according to claim 1 further comprising:
   a transfer device configured to move the chuck tool for transferring said elongated member to an object to be fastened in a state in which said elongated member is held by the chuck tool.

5. The elongated member chucking apparatus according to claim 1 further comprising:
   a tray having a plurality of said cases.

6. An elongated member chucking apparatus comprising:
   a case having a bottom lid portion, a side portion and an open end which is arranged opposite to the bottom lid portion, the bottom lid portion including an inner bottom surface;
   a chuck tool having a lower surface; and
   a vibration device,
   wherein said inner bottom surface of the case is formed in a concave shape or a substantial V-shape, and any point on said inner bottom surface is lower as a distance from a central axis of the inner bottom surface is smaller,
   wherein said lower surface of the chuck tool is formed in a concave shape or a substantially inverted V-shape, and any point on said lower surface is higher as a distance from a central axis of the lower surface is smaller,
   wherein the chuck tool is configured to hold an elongated member in a predetermined orientation in a state in which said elongated member inside the case is sandwiched between said inner bottom surface and said lower surface,
   wherein the vibration device is configured to apply a vibration to said lower surface of the chuck tool in the state in which said elongated member inside the case is sandwiched between said inner bottom surface and said lower surface, and
   wherein the chuck tool is configured to take out said elongated member through the open end.

7. An elongated member chucking method, the method being performed using an elongated member chucking apparatus,
   wherein the elongated member chucking apparatus comprises:
   a case having a bottom lid portion, a side portion and an open end which is arranged opposite to the bottom lid portion, the bottom lid portion including an inner bottom surface; and
   a chuck tool having a lower surface,
   wherein said inner bottom surface of the case is formed in a concave shape or a substantial V-shape, and any point on said inner bottom surface is lower as a distance from a central axis of the inner bottom surface is smaller, and
   wherein said lower surface of the chuck tool is formed in a concave shape or in a substantially inverted V-shape, and any point on said lower surface is higher as a distance from a central axis of the lower surface is smaller,
   the elongated member chucking method comprising:
   moving the chuck tool and sandwiching an elongated member inside the case between said inner bottom surface and said lower surface,
   holding said elongated member by the chuck tool in a predetermined orientation when said elongated member is sandwiched between said inner bottom surface and said lower surface,
   rotating said lower surface of the chuck tool in advance of said holding when said elongated member inside the case is sandwiched between said inner bottom surface and said lower surface, and taking out said elongated member through the open end using the chuck tool.

8. The elongated member chucking method according to claim 7 further comprising:

moving the chuck tool for transferring said elongated member to an object to be fastened when said elongated member is held by the chuck tool.

* * * * *